(12) United States Patent
Kawai et al.

(10) Patent No.: US 11,929,478 B2
(45) Date of Patent: Mar. 12, 2024

(54) FILLING MEMBER AND BATTERY PACK

(71) Applicant: Mitsubishi Chemical Corporation, Tokyo (JP)

(72) Inventors: Tomohiro Kawai, Tokyo (JP); Hiroki Hayami, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 409 days.

(21) Appl. No.: 17/164,896

(22) Filed: Feb. 2, 2021

(65) Prior Publication Data

US 2021/0159559 A1 May 27, 2021

Related U.S. Application Data

(63) Continuation of application No. PCT/JP2019/036283, filed on Sep. 17, 2019.

(30) Foreign Application Priority Data

Sep. 14, 2018 (JP) ................. 2018-172560

(51) Int. Cl.
*H01M 10/651* (2014.01)
*H01M 10/052* (2010.01)
(Continued)

(52) U.S. Cl.
CPC ....... *H01M 10/651* (2015.04); *H01M 10/052* (2013.01); *H01M 10/647* (2015.04);
(Continued)

(58) Field of Classification Search
None
See application file for complete search history.

(56) References Cited

U.S. PATENT DOCUMENTS 8,846,233 B2 * 9/2014 Lee ................. H01M 10/6555
429/120
2011/0070476 A1 3/2011 Takahashi et al.
(Continued)

FOREIGN PATENT DOCUMENTS

JP 2009-283148 A 12/2009
JP 2010-097693 A 4/2010
(Continued)

OTHER PUBLICATIONS

Machine Translation of WO2018/124231A1 (Year: 2018).*
(Continued)

*Primary Examiner* — Gregg Cantelmo
(74) *Attorney, Agent, or Firm* — Oblon, McClelland, Maier & Neustadt, L.L.P.

(57) ABSTRACT

A filling member is interposed between pouch cells of a battery pack, the filling member has a first surface orthogonal to a thickness direction thereof and a second surface opposite to the first surface, $\theta_{d1}$ and $\theta_{d2}$ defined below satisfy formulas (1) and (2) below, respectively, $\theta_p$ satisfies formula (3) below, and $\theta_{d1} > \theta_{d2}$ holds: (1) $\theta_{d1} \geq 3.0 \times 10^{-3}$ (m²·K)/W, (2) $\theta_{d2} \leq 8.0 \times 10^{-3}$ (m²·K)/W, (3) 0.5 K/W $\leq \theta_{p1} \leq$ 1000 K/W, and (4) 0.5 K/W $\leq \theta_{p2} \leq$ 1000 K/W. $\theta_{d1}$ is heat transfer resistance when the average temperature of one of the first and second surfaces exceeds 180° C., $\theta_{d2}$ is heat transfer resistance when the average temperatures of the first and second surfaces both do not exceed 80° C., $\theta_{p1}$ is heat transfer resistance when the average temperature exceeds 180° C., $\theta_{p2}$ is heat transfer resistance when the average temperatures do not exceed 80° C.

9 Claims, 5 Drawing Sheets

(51) Int. Cl.
- *H01M 10/647* (2014.01)
- *H01M 10/6555* (2014.01)
- *H01M 10/6557* (2014.01)
- *H01M 10/6567* (2014.01)
- *H01M 10/658* (2014.01)
- *H01M 50/105* (2021.01)
- *H01M 50/124* (2021.01)
- *H01M 50/129* (2021.01)
- *H01M 50/133* (2021.01)
- *H01M 50/211* (2021.01)
- *H01M 50/291* (2021.01)

(52) U.S. Cl.
CPC ... *H01M 10/6555* (2015.04); *H01M 10/6557* (2015.04); *H01M 10/6567* (2015.04); *H01M 10/658* (2015.04); *H01M 50/105* (2021.01); *H01M 50/124* (2021.01); *H01M 50/133* (2021.01); *H01M 50/211* (2021.01); *H01M 50/291* (2021.01); *H01M 50/129* (2021.01)

(56) References Cited

U.S. PATENT DOCUMENTS

| | | | |
|---|---|---|---|
| 2011/0159340 A1* | 6/2011 | Hu | H01M 10/617 429/120 |
| 2013/0323564 A1 | 12/2013 | Beyerle et al. | |
| 2016/0049704 A1 | 2/2016 | Beyerle et al. | |
| 2019/0319223 A1 | 10/2019 | Watanabe et al. | |

FOREIGN PATENT DOCUMENTS

| JP | 2010-165597 A | 7/2010 |
|---|---|---|
| WO | WO 2018/124231 A1 | 7/2018 |

OTHER PUBLICATIONS

Extended European Search Report dated Mar. 15, 2022 in corresponding European Patent Application No. 19859019.2, 7 pages.
International Search Report dated Nov. 5, 2019 in PCT/JP2019/036283 filed on Sep. 17, 2019, therein, 3 pages.

* cited by examiner

FILLING MEMBER AND BATTERY PACK

TECHNICAL FIELD

The present invention relates to a filling member and to a battery pack including the filling member.

BACKGROUND ART

Secondary batteries have been used as power sources of vehicles etc. For the purpose of increasing flexibility in installation in a limited space in, for example, a vehicle and for the purpose of increasing its cruising range per charge, a wide variety of studies have been conducted to increase the energy density of secondary batteries.

The safety of a secondary battery tends to be contradictory to its energy density. The higher the energy density of a secondary battery, the lower the safety tends to be. For example, in a secondary battery installed in an electric vehicle with a cruising range of several hundred km, when the secondary battery is damaged by overcharging, an internal short circuit, etc., the surface temperature of the battery can exceed several hundred ° C. and can reach about 1000° C.

A secondary battery used as a power source of, for example, a vehicle is generally a battery pack including a plurality of cells. When one of the cells in the battery pack is damaged and the temperature of this cell reaches a high temperature as described above, the heat of the damaged cell may cause adjacent cells to be damaged, so that the entire battery pack may be damaged in a chain manner. To prevent the chain of damage to the cells, various techniques have been proposed. For example, in one technique, the damaged cell is cooled. In another technique, heat transfer from the damaged cell to undamaged cells is reduced.

PTL 1 describes partition members disposed between cells and formed of a meltable base material and a thermosetting resin, and melting of the base material is utilized to reduce heat transfer through the partition members. PTL 2 describes partition members disposed between storage cells and formed of a resin-made base material and a foaming agent that is held in the base material and is thermally decomposable when an increase in temperature occurs due to heat generation of a storage cell. PTL 3 describes partition members each separating cells or a cell and another member from each other. It is stated that, by controlling the heat transfer resistance of the partition members in their thickness direction to meet specific conditions, spread of burning of cells can be prevented or retarded.

CITATION LIST

Patent Literature

PTL 1: JP2010-97693A
PTL 2: JP2010-165597A
PTL 3: WO2018/124231A1

SUMMARY OF INVENTION

Technical Problem

At present, widely used cells include rectangular cells, cylindrical cells, and pouch cells. In PTL 1 to PTL 3, the cells are mainly rectangular cells.

An object of the present invention is to provide a filling member that can improve the safety of a battery pack including pouch cells when the filling member is used for the battery pack and to provide a battery pack including the filling member.

Solution to Problem

The present inventors have conducted detailed studies to achieve the above object and found that the above object can be achieved by a filling member used between pouch cells and having a heat transfer resistance (hereinafter may be referred to also as thermal resistance) that meets specific conditions. The present invention is summarized as follows.
[1] A filling member to be interposed between pouch cells of a battery pack,
the filling member having a first surface orthogonal to a thickness direction thereof and a second surface opposite to the first surface,
wherein $\theta_{d1}$ and $\theta_{d2}$ defined below satisfy formulas (1) and (2) below, respectively, wherein $\theta_p$ satisfies formula (3) below, and wherein $\theta_{d1} > \theta_{d2}$ holds:

$$\theta_{d1} \geq 3.0 \times 10^{-3} \ (m^2 \cdot K)/W, \quad (1)$$

$$\theta_{d2} \leq 8.0 \times 10^{-3} \ (m^2 \cdot K)/W, \quad (2)$$

$$0.5 \ K/W \leq \theta_{p1} \leq 1000 \ K/W, \quad (3)$$

$$0.5 \ K/W \leq \theta_{p2} \leq 1000 \ K/W, \quad (4)$$

$\theta_{d1}$: a heat transfer resistance per unit area in the thickness direction when the average temperature of one of the first and second surfaces exceeds 180° C.,
$\theta_{d2}$: a heat transfer resistance per unit area in the thickness direction when the average temperatures of the first and second surfaces both do not exceed 80° C.,
$\theta_{p1}$: a heat transfer resistance in a plane direction when the average temperature of one of the first and second surfaces exceeds 180° C.,
$\theta_{p2}$: a heat transfer resistance in the plane direction when the average temperatures of the first and second surfaces both do not exceed 80° C.
[2] The filling member according to [1], wherein the filling member comprises a partition member and a heat transfer sheet,
wherein, when the average temperature of one of the first and second surfaces exceeds 180° C., the thermal conductivity of the partition member in the thickness direction is from $2.0 \times 10^{-2}$ W/m·K to 2.0 W/m·K inclusive,
wherein, when the average temperatures of the first and second surfaces both do not exceed 80° C., the thermal conductivity of the partition member in the thickness direction is from $5.0 \times 10^{-2}$ W/m·K to $5.0 \times 10^{1}$ W/m·K inclusive, and
wherein the thermal conductivity of the heat transfer sheet (B) in the plane direction is from $1.0 \times 10^{1}$ W/m·K to $2.0 \times 10^{3}$ W/m·K inclusive, irrespective of the temperature of the partition member.
[3] The filling member according to [2], wherein the thickness of the heat transfer sheet is 0.02 to 2 mm.
[4] The filling member according to [2] or [3], wherein the thickness of the filling member is 0.2 to 10 mm.
[5] The filling member according to [1], wherein the thickness of the filling member is 0.2 to 10 mm.
[6] A battery pack comprising: a plurality of pouch cells; and a filling member according to any one of [1] to [5], the filling member being interposed between each two adjacent pouch cells of the plurality of pouch cells.

[7] The battery pack according to [6], wherein the first and second surfaces of each of the filling member that is interposed between corresponding two adjacent pouch cells of the plurality of pouch cells face the respective two adjacent pouch cells of the plurality of pouch cells.
[8] The battery pack according to [6] or [7], wherein the pouch cells are enclosed by an exterior material, and wherein the exterior material has a layered structure including a resin layer and a metal foil layer.
[9] The battery pack according to any one of [6] to [8], wherein, when the thickness of each of the pouch cells is L, the thickness of the filling member is L/50 to L/10.
[10] The battery pack according to any one of [6] to [9], wherein the filling member is the filling member according to any one of [2] to [4], and wherein, when the thickness of each of the pouch cells is L, the thickness of the heat transfer sheet is L/1000 to L/10.
[A1] A filling member having two surfaces orthogonal to a thickness direction thereof and used in a battery pack including a plurality of pouch cells, the filling member separating two of the pouch cells from each other, wherein $\theta_{d1}$ and $\theta_{d2}$ defined below satisfy formulas (1) and (2), respectively:

$$\theta_{d1} \geq 5.0 \times 10^{-3} \ (m^2 \cdot K)/W, \quad (1)$$

$$\theta_{d2} \leq 4.0 \times 10^{-3} \ (m^2 \cdot K)/W, \quad (2)$$

$\theta_{d1}$: a heat transfer resistance in the thickness direction when the average temperature of one of the two surfaces exceeds 180° C.,
$\theta_{d2}$: a heat transfer resistance in the thickness direction when the average temperatures of the first and second surfaces both do not exceed 80° C.
[A2] The filling member according to [A1], wherein $\theta_{p1}$ and $\theta_{p2}$ defined below satisfy formulas (3) and (4), respectively:

$$\theta_{p1} \geq 1.0 \times 10^{-7} \ (m^2 \cdot K)/W, \quad (3)$$

$$\theta_{p2} \geq 1.0 \times 10^{-7} \ (m^2 \cdot K)/W, \quad (4)$$

$\theta_{p1}$: a heat transfer resistance in a plane direction when the average temperature of one of the two surfaces exceeds 180° C.,
$\theta_{P2}$: a heat transfer resistance in the plane direction when the average temperatures of the two surfaces both do not exceed 80° C.
[A3] The filling member according to [A1] or [A2], wherein the filling member includes a partition member (A) and a heat transfer sheet (B), wherein the thermal conductivity of the partition member (A) in the thickness direction, when the average temperature of one of the two surfaces exceeds 180° C., the thermal conductivity of the partition member (A) in the thickness direction is from $2.0 \times 10^{-2}$ W/m·K to 2.0 W/m·K inclusive, wherein, when the average temperatures of the two surfaces of the partition member (A) that are orthogonal to the thickness direction both do not exceed 80° C., the thermal conductivity of the partition member (A) in the thickness direction is from $5.0 \times 10^{-2}$ W/m·K to $5.0 \times 10^1$ W/m·K inclusive, and wherein the thermal conductivity of the heat transfer sheet (B) in a plane direction is from $2.0 \times 10^{-2}$ W/m·K to $1.0 \times 10^5$ W/m·K inclusive irrespective of the temperature of the partition member (A).
[A4] The filling member according to any one of [A1] to [A3], wherein the thickness of the filling member is 0.2 to 10 mm.

[A5] A battery pack including: a plurality of pouch cells; and the filling member according to any one of [A1] to [A4], wherein the filling member separates two of the pouch cells from each other.
[A6] The battery pack according to [A5], wherein the pouch cells are enclosed by an exterior material, and wherein the exterior material has a layered structure including a resin layer and a metal foil layer.
[A7] The battery pack according to [A5] or [A6], wherein the thickness of each of the pouch cells is L, and the thickness of the filling member is L/50 to L/10.

Advantageous Effects of Invention

The filling member of the present invention reduces heat transfer between pouch cells.

DESCRIPTION OF EMBODIMENTS

Figure 1A:
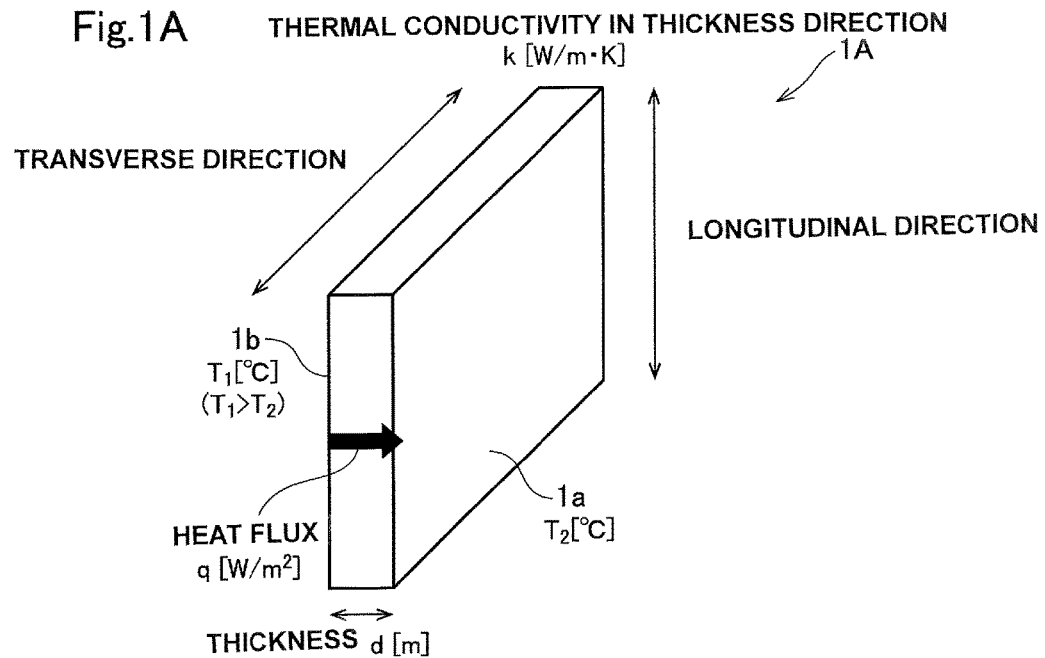
FIG. 1A is a perspective view exemplifying a filling member.

The present invention will be described in detail. The following description provides examples (representative examples) of embodiments of the present invention, and the invention is not limited to these embodiments so long as the invention does not depart from the scope of the invention.
The battery pack of the present invention includes a plurality of pouch cells and filling members each disposed between adjacent pouch cells. An example of the battery pack is shown in FIG. 1C.
The battery pack 10 in FIG. 1C includes a cooling plate 11, a plurality of pouch cells 12 disposed on the cooling plate 11, and filling members 20 each disposed between adjacent pouch cells 12. In the battery pack 10 in FIG. 1C, a filling member 20 is disposed also on the outer side of a pouch cell 12 at one end (the left end in the figure) in the arrangement direction.
In FIG. 1C, eight pouch cells 12 are shown, but the number of pouch cells 12 is not limited to eight. Generally, about 2 to about 500 pouch cells are arranged.
In this battery pack 10, each filling member 20 is obtained by stacking a plate-shaped partition member 21 and a heat transfer sheet 22 having an L-shaped cross section. The plate-shaped partition member 21 has two plate surfaces, i.e., first and second surfaces 21a and 21b orthogonal to its thickness direction.

Each heat transfer sheet 22 includes a main piece 22a overlapping a corresponding partition member 21 and an extending piece 22b extending from the main piece 22a. Each extending piece 22b is interposed between a corresponding pouch cell 12 and the cooling plate 11.

Each filling member 20 is an example of the filling member of the present invention. Other examples of the filling member are shown in FIGS. 1A, 1B, 1D, and 1E.

FIG. 1A exemplifies a filling member 1A having a cuboidal (plate) shape having a longitudinal length, a transverse length, and a thickness (width). The filling member 1A has two surfaces 1a and 1b orthogonal to its thickness direction. The surface 1a is one of the plate surfaces of the filling member 1A, and the surface 1b is the other plate surface.

The filling member 1A is disposed between pouch cells included in a battery pack so as to separate the pouch cells from each other. With the filling member 1A disposed between the pouch cells, the surface 1a and the surface 1b face the respective pouch cells. The surface 1a and the surface 1b may be disposed so as to be in contact with the respective pouch cells facing each other or may be disposed so as to be separated from the respective pouch cells with gaps formed therebetween. To reduce the heat transfer resistance, it is preferable that the surfaces 1a and 1b are in contact with the respective pouch cells.

It is preferable that the filling member 1A shown in FIG. 1A is disposed such that the surface 1a and the surface 1b face the respective pouch cells. However, the filling member 1A may be disposed such that surfaces other than the surfaces 1a and 1b face respective pouch cells.

Figure 1B:
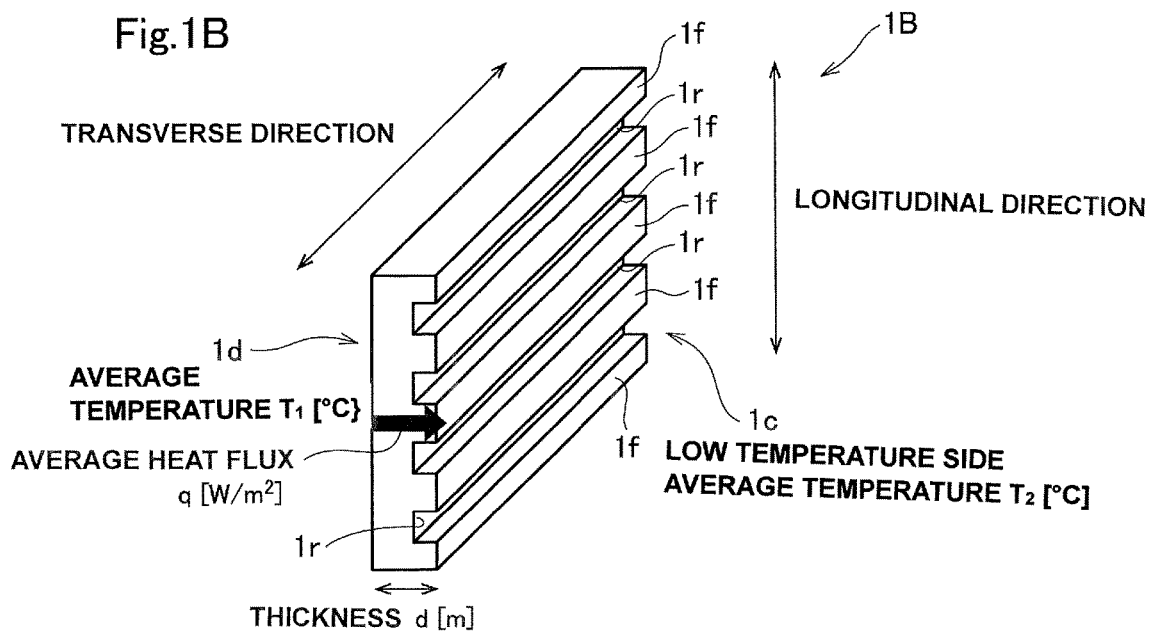
FIG. 1B is a perspective view exemplifying a filling member having a comb structure.
Figure 1C:
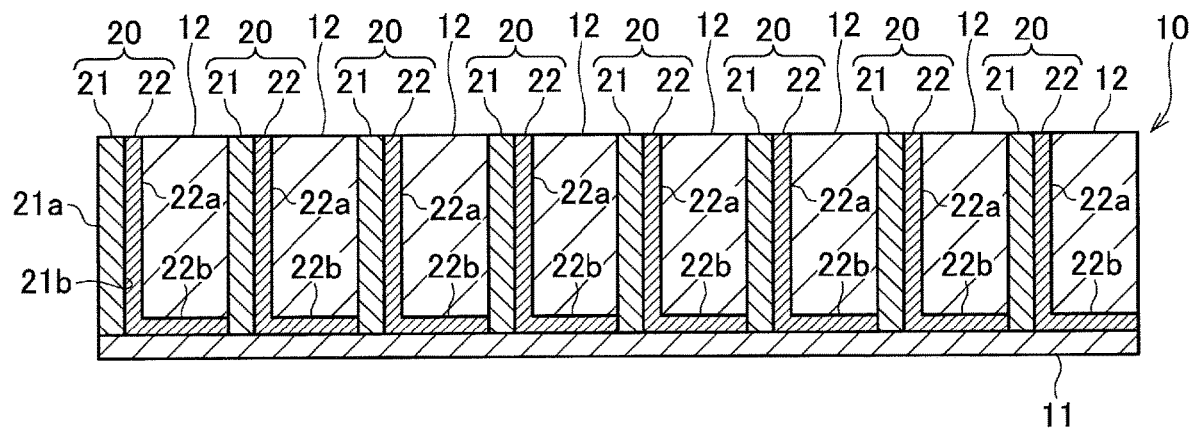
FIG. 1C is a cross-sectional view showing an example of a battery pack that uses filling members each including a partition member and a heat transfer sheet.

FIG. 1B exemplifies a filling member 1B having a comb structure. The filling member 1B is formed so as to have a plate-like overall shape. The filling member 1B has two surfaces 1c and 1d orthogonal to its thickness direction. The surface 1c as a whole is formed as one flat surface. The surface 1d includes long narrow surfaces 1f extending parallel to the transverse direction of the filling member 1B and bottom surfaces 1r of grooves recessed from the surfaces 1f. The grooves extend from one transverse end of the filling member 1B to the other transverse end so as to be parallel to the transverse direction. Therefore, the filling member has a comb shape when viewed in the transverse direction.

Figure 1D:
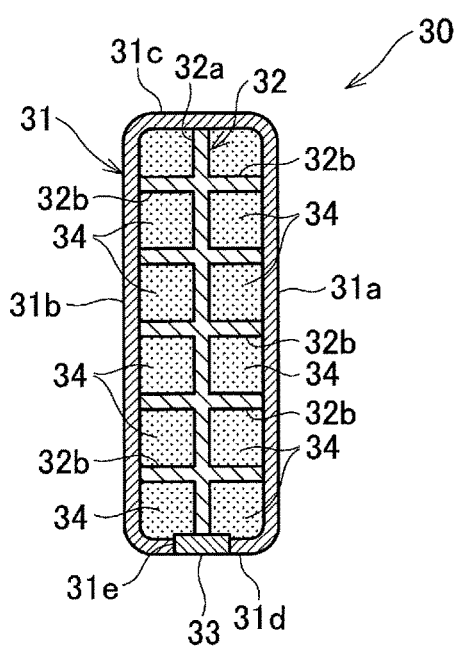
FIG. 1D is a cross-sectional view of a filling member including a pouch structure.

A filling member 30 shown in FIG. 1D includes a pouch structure 31, a lattice-shaped frame 32 disposed inside the pouch structure 31, and a fluid material 34 charged inside the pouch structure 31 and in a liquid state at T [° C.]. An opening 31e provided on a lower surface 31d of the pouch structure is closed with a stopper 33 formed of a material having a melting point around T [° C.].

The opening 33 may be provided in a lower portion of the pouch structure 31 other than the lower surface 31d.

The pouch structure 31 has a substantially cuboidal hollow shape having a pair of longitudinal principal surfaces 31a and 31b, an upper surface 31c, and the lower surface 31d.

The frame 32 has a lattice shape including a longitudinal piece 32a parallel to the principal surfaces 31a and 31b and a plurality of transverse pieces rising substantially perpendicularly from the longitudinal piece 32a. The longitudinal piece 32a extends from the lower surface 31d to the upper surface 31c. The plurality of transverse pieces 32b are arranged at intervals in the height direction. The forward ends of the transverse pieces 32b abut against the rear side of the principal surface 31a or 31b.

Figure 1E:
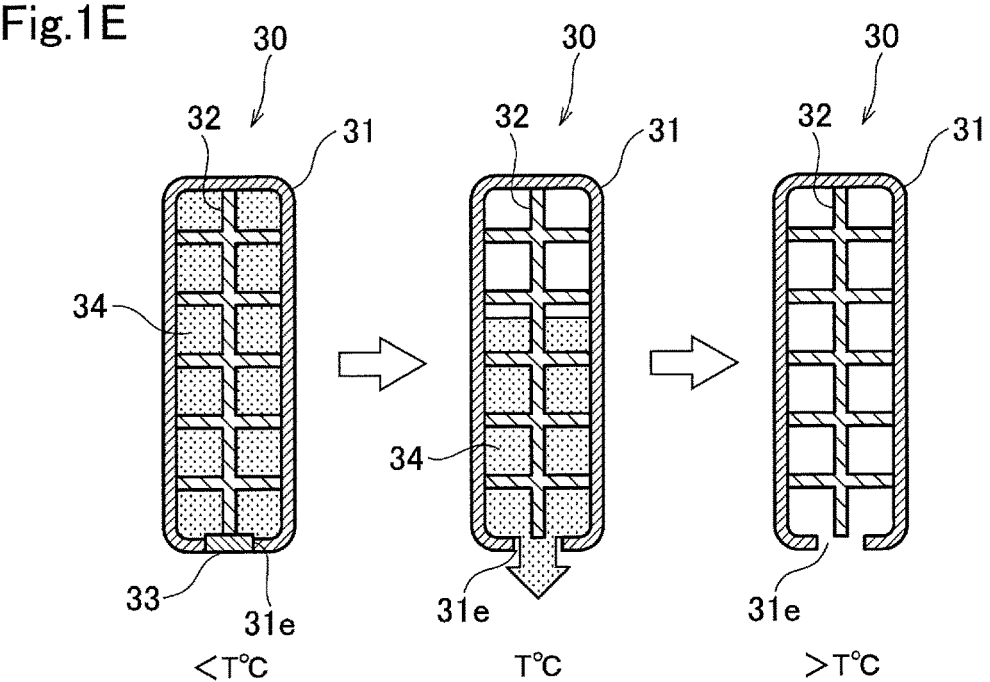
FIG. 1E is a cross-sectional view showing the operation of the filling member in FIG. 1D.

As shown in FIG. 1E, when the stopper 33 melts, the fluid material 34 in the pouch structure 31 flows down through the opening 31e to the outside. The frame 32 has the function of retaining the shape of the pouch structure 31. Since the pouch structure 31 is disposed, the hollow shape of the pouch structure is maintained even after the fluid material 34 has flown out.

The filling member 30 in FIG. 1F includes the frame 32. However, the filling member may have a structure in which the frame 32 is omitted.

A plurality of pouch structures 31 may be arranged in transverse or longitudinal direction between cells. The stopper 33 is not an essential member. The melting point of the material 34 forming the stopper 33 may be equal to or lower than the melting point of the fluid material. The stopper may be formed of the same material as the material of the fluid material 34. The fluid material 34 may be a liquid at T [° C.] or may be in a flowable state other than the liquid state.

The filling member of the present invention may be composed of a single member or may be composed of a plurality of members. One example of the filling member composed of a plurality of members is a filling member 20 including the partition member 21 and the heat transfer sheet 22 shown in FIG. 1C and is preferably a filling member 20 obtained by staking the partition member 21 and the heat transfer sheet 22.

These filling members 20 are examples of the filling member having a partition member and a heat transfer sheet and may be a filling member including a partition member and a heat transfer sheet other than those in FIG. 1C.

From the viewpoint of preventing a chain of damage to cells to thereby keep the energy density of the battery pack high, the thickness of the filling member is preferably L/50 or more and more preferably L/40 or more, where L is the thickness of each of the pouch cells included in the battery pack. The thickness of the filling member is preferably L/10 or less and more preferably L/11 or less.

The thickness of the filling member is preferably 0.2 mm or more and more preferably 0.3 mm or more. The thickness of the filling member is preferably 10 mm or less and more preferably 9 mm or less.

[Heat Transfer Characteristics of Filling Member]

The filling member of the present invention has two surfaces opposite to each other in its thickness direction and is used for a battery pack including a plurality of pouch cells so as to separate pouch cells from each other, and $\theta_{d1}$ and $\theta_{d2}$ defined below satisfy the following formulas (1) and (2), respectively.

$$\theta_{d1} \geq 3.0 \times 10^{-3} \text{ (m}^2 \cdot \text{K)/W}, \tag{1}$$

$$\theta_{d2} \leq 8.0 \times 10^{-3} \text{ (m}^2 \cdot \text{K)/W}, \tag{2}$$

$\theta_{d1}$: A heat transfer resistance in the thickness direction when the average temperature of one of the two surfaces of the filling member exceeds 180° C.

$\theta_{d2}$: A heat transfer resistance in the thickness direction when the average temperatures of the two surfaces of the filling member are both lower than 80° C.

The filling member of the present invention separates pouch cells included in a battery pack from each other and has two surfaces opposite to each other in the thickness direction. The thermal resistance ($\theta_{d1}$) per unit area in the thickness direction when the average temperature of one of the two surfaces exceeds 180° C. satisfies formula (1), and the thermal resistance ($\theta_{d2}$) per unit area in the thickness direction when the average temperatures of the two surfaces both do not exceed 80° C. satisfies formula (2) above. When $\theta_{d1}$ does not satisfy formula (1) and formula (2), if abnormal heat generation occurs in one of the cells in the battery pack, the amount of heat transfer from this cell to an adjacent cell is large, and this may facilitate an increase in the temperature of the adjacent cell, so that abnormal heat generation may occur in the adjacent cell.

$\theta_{d1}$ is preferably $3.0 \times 10^{-3}$ (m²·K)/W or more, more preferably $4.0 \times 10^{-3}$ (m²·K)/W or more, still more preferably $5.0 \times 10^{-3}$ (m²·K)/W or more, and particularly preferably $6.0 \times 10^{-3}$ (m²·K)/W or more. $\theta_{d1}$ is preferably $15.0 \times 10^{-2}$ (m²·K)/W or less and more preferably $2.0 \times 10^{-2}$ (m²·K)/W or less.

$\theta_{d2}$ is preferably $8.0 \times 10^{-3}$ (m²·K)/W or less, more preferably $7.5 \times 10^{-3}$ (m²·K)/W or less, still more preferably $7.0 \times 10^{-3}$ (m²·K)/W or less, and particularly preferably $6.5 \times 10^{-3}$ (m²·K)/W or less. $\theta_{d2}$ is preferably $1.0 \times 10^{-3}$ (m²·K)/W or more and $1.5 \times 10^{-3}$ (m²·K)/W or more.

It is necessary that the thermal resistance of a filling member disposed between a cell undergoing thermal runaway and a cell adjacent thereto be increased in order to reduce the amount of heat transfer. It is also necessary that the thermal resistance of other filling members be small in order to facilitate heat transfer. Therefore, $\theta_{d1} - \theta_{d2}$ is preferably $5.0 \times 10^{-4}$ (m²·K)/W or more, more preferably $1.0 \times 10^{-3}$ (m²·K)/W or more, and still more preferably $2.0 \times 10^{-3}$ (m²·K)/W or more. $\theta_{d1} - \theta_{d2}$ is preferably $2.0 \times 10^{-2}$ (m²·K)/W or less.

It is preferable that, in the filling member of the present invention, $\theta_{p1}$ and $\theta_{p2}$ defined below satisfy the following formulas (3) and (4), respectively. When the filling member satisfies formulas (3) and (4), if abnormal heat generation occurs in one of the cells in the battery, the amount of heat transfer from a cell adjacent to this cell to cells therearound not undergoing abnormal heat generation is small. Therefore, an increase in the temperature of the surrounding cells is prevented, so that the occurrence of abnormal heat generation in the surrounding cells is prevented.

$$0.5 \text{ K/W} \leq \theta_{p1} \leq 1000 \text{ K/W}, \quad (3)$$

$$0.5 \text{ K/W} \leq \theta_{p2} \leq 1000 \text{ K/W}, \quad (4)$$

$\theta_{p1}$: A heat transfer resistance in a plane direction when the average temperature of one of the two surfaces of the charging member exceeds 180° C.

$\theta_{p2}$: A heat transfer resistance in a plane direction when the average temperatures of the two surfaces of the filling member are both less than 80° C.

$\theta_{p1}$ is preferably $5.0 \times 10^{-1}$ K/W or more and more preferably 2.0 K/W or more. No particular limitation is imposed on the upper limit of $\theta_{p1}$. $\theta_{p1}$ is generally $5.0 \times 10^3$ K/W or less and more preferably $1.0 \times 10^3$ K/W or less.

$\theta_{p2}$ is preferably $5.0 \times 10^{-1}$ K/W or more and more preferably 2.0 K/W or more. No particular limitation is imposed on the upper limit of $\theta_{p2}$. $\theta_{p2}$ is generally $5.0 \times 10^3$ K/W or less and more preferably $1.0 \times 10^3$ K/W or less.

In the present invention, when the filling member is composed of a plurality of members, the thermal resistances $\theta_{d1}$, $\theta_{d2}$, $\theta_{p1}$, and $\theta_{p2}$ can be treated as combined thermal resistances obtained from the thermal resistances of the members forming the filling member. A method for computing the combined thermal resistances will be described later.

[Preferred Characteristics and Specifications of Filling Member Including Partition Member and Heat Transfer Sheet]

As described above, the filling member of the present invention may be composed of a single member or may be composed of a combination of a plurality of members. Preferably, the filling member is composed of a combination of a plurality of members. Particularly preferably, the filling member includes a partition member and a heat transfer sheet, as does the filling member 20.

When the average temperature of one of the two surfaces of the partition member (e.g., the two surfaces 21a and 21b of the partition member 21 of the filling member 20) that are orthogonal to the thickness direction exceeds 180° C., the thermal conductivity of the partition member in the thickness direction is preferably $2.0 \times 10^{-2}$ W/m·K or more and more preferably $3.0 \times 10^{-2}$ W/m·K or more. In this case, the thermal conductivity is preferably 2.0 W/m·K or less and more preferably 1.9 W/m·K or less.

When the average temperatures of the two surfaces of the partition member that are orthogonal to the thickness direction both do not exceed 80° C., the thermal conductivity of the partition member in the thickness direction is preferably $5.0 \times 10^{-2}$ W/m·K or more and more preferably $1.0 \times 10^{-1}$ W/m·K or more. In this case, the thermal conductivity is preferably $5.0 \times 10$ W/m·K or less and more preferably $4.0 \times 10$ W/m·K or less.

When the thermal conductivity of the partition member satisfies the above conditions, heat transfer from a cell undergoing abnormal heat generation to a cell adjacent thereto is reduced, and heat transfer between cells not undergoing abnormal heat generation is facilitated. The safety of the battery pack is thereby improved.

The thermal conductivity of the heat transfer sheet in a plane direction is preferably $1.0 \times 10^{-1}$ W/m·K or more and more preferably $1.0 \times 10$ W/m·K or more, irrespective of the temperature of the partition member. The thermal conductivity of the heat transfer sheet in the plane direction is preferably $1.0 \times 10^3$ W/m·K or less, more preferably $8.0 \times 10^2$ W/m·K or less, still more preferably $7.0 \times 10^2$ W/m·K or less, particularly preferably $6.0 \times 10^2$ W/m·K or less, and most preferably $5.0 \times 10^2$ W/m·K or less. When the thermal conductivity of the heat transfer sheet satisfies the above conditions, removal of the heat of a cell undergoing abnormal heat generation is facilitated at relatively low cost. A chain of damage to the cells is thereby prevented.

Examples of the material of the heat transfer sheet include graphite, graphene, metals (aluminum (including aluminum foils, aluminum plates, etc.), copper (including copper foils, copper plates, etc.), metal meshes (such as aluminum meshes and copper meshes), and carbon fiber sheets and plates. Of these, graphite sheets and aluminum plates are preferred. The heat transfer sheet used may be a sheet obtained by laminating a resin film onto any of the above materials.

The thickness of the partition member is preferably 0.2 mm or more and more preferably 0.3 mm or more and is preferably 10 mm or less and more preferably 9 mm or less. It is preferable that the thickness of the partition member is in the above range because a chain of damage to the cells is prevented and the energy density of the battery pack is kept high.

The thickness of the heat transfer sheet is preferably 0.006 mm or more, more preferably 0.02 mm or more, and still more preferably 0.05 mm or more and is preferably 10 mm or less, more preferably 9 mm or less, and still more preferably 5 mm or less. It is preferable that the thickness of the heat transfer sheet is in the above range because a chain of damage to the cells is prevented and the energy density of the battery pack is kept high.

[Thermal Resistance of Filling Member]

In the present invention, the thermal resistance per unit area of the filling member means the heat transfer resistance per unit cross-sectional area of the filling member in the thickness direction. The thermal resistance per unit area of the filling member in the thickness direction can be represented using the thermal conductivity (k [W/m·K]) of the material used for the filling member in its thickness direction and the thickness (d [m]) of the filling member. The unit area in this case is a unit area of a surface perpendicular to the thickness direction.

A description will be given of the thermal resistance ($\theta_d$) per unit area of the filling member 1A shown in FIG. 1A in its thickness direction. The filling member 1A is formed of one material and has a constant density. The thermal conductivity of the filling member 1A in its thickness direction is denoted as k [W/m·K], and the thickness of the filling member 1A is denoted as d [m]. The average value of the surface temperature of the surface 1b is denoted as $T_1$ [° C.], and the average value of the surface temperature of the surface 1a is denoted as $T_2$ [° C.].

When $T_2$ is lower than $T_1$, the difference in surface temperature between the surface 1b and the surface 1a of the filling member 1A is $T_1 - T_2$, and the heat flows in the thickness direction, i.e., from the surface 1b to the surface 1a. The amount of heat flow (heat flux) q per unit area of the filling member 1A can be represented by formula (11) below.

$$q = k(T_1 - T_2)/d \, [\text{W/m}^2] \tag{11}$$

The heat flux (q) can also be represented by formula (12) below using the thermal resistance ($\theta_d$) per unit area in the thickness direction.

$$q = (1/\theta_d)(T_1 - T_2) \tag{12}$$

Then, from formulas (11) and (12), the thermal resistance ($\theta_d$) per unit area in the thickness direction can be represented by formula (13) below.

$$\theta_d = d/k \, [\text{m}^2 \cdot \text{K/W}] \tag{13}$$

The definition of the thermal resistance ($\theta_p$) of the filling member 1A in a plane direction will be described. The plane direction is a direction parallel to the surfaces 1a and 1b. The thermal conductivity of the filling member 1A is assumed to be isotropic, i.e., the thermal conductivity in the thickness direction is assumed to be equal to the thermal conductivity in the plane direction. The thermal resistance of the filling member in the plane direction is inversely proportional to the product k·d, i.e., the product of the thermal conductivity (k [W/m·K]) of the filling member and its thickness (d [m]), and is defined by the following formula (14).

$$\theta_p = 1/(k \cdot d) \, [\text{K/W}] \tag{14}$$

The shape (structure) of the filling member is not limited to the cuboidal shape. Even when the filling member has a comb structure, a hollow structure, or a lattice structure, the thermal resistance per unit area of the filling member in the thickness direction can be represented by formula (13) above. The filling member may be formed not only of one material but also of a combination of a plurality of materials. Even when the filling member is formed of a combination of a plurality of materials, the thermal resistance per unit area of the filling member in the thickness direction can be represented by formula (13) above.

When the filling member is formed of a combination of a plurality of materials, two or more selected from the following various materials may be combined: polyethylene, chlorinated polyethylene, ethylene-vinyl chloride copolymers, ethylene-vinyl acetate copolymers, polyvinyl acetate, polypropylene, polybutene, polybutadiene, polymethylpentene, polystyrene, poly-α-methylstyrene, poly-p-vinyl phenol, ABS resins, SAN resins, AES resins, AAS resins, methacrylic resins, norbornene resins, polyvinyl chloride, acrylic modified polyvinyl chloride, polyvinylidene chloride, polyallylamine, polyvinyl ether, polyvinyl alcohol, ethylene-vinyl alcohol copolymers, petroleum resins, thermoplastic elastomers, thermoplastic polyurethane resins, polyacrylonitrile, polyvinyl butyral, phenolic resins, epoxy resins, urea resins, melamine resins, furan resins, unsaturated polyester resins, diallyl phthalate, guanamines, ketone resins, cellulose acetate, cellophane, cellulose nitrate, acetylcellulose, nylon, polyamides, polyacetal, polyoxymethylene, polycarbonate, polycarbonate/ABS alloys, polycarbonate/polyester alloys, polyphenylene ether, polybutylene terephthalate, polyethylene terephthalate, polysulfones, polyether sulfones, polyphenylene sulfide, polyarylate, polyamide-imides, polyetherimide, polyether ether ketone, ultra-high-molecular-weight polyethylene, isotactic polystyrene, liquid crystal polymers, polyimides, tetrafluoroethylene-perfluoroalkoxy vinyl ether copolymers, tetrafluoroethylene-hexafluoroethylene copolymers, polychlorotrifluoroethylene, tetrafluoroethylene-ethylene copolymers, polyvinylidene fluoride, polyvinyl fluoride, polyaminobismaleinimides, polytriazine, crosslinked polyamide-imides, and fluorocarbon resins other than the above materials.

The thermal resistance ($\theta_d$) per unit area of the filling member 1B shown in FIG. 1B in the thickness direction is determined as follows. Let the average temperature of the surface 1d be $T_1$, and let the average temperature of the surface 1c be $T_2$. Using $T_1$ and $T_2$, the amount of heat flow per unit area through the filling member 1B and the thermal resistance per unit area of the filling member 1B can be represented by formulas (11), (12), and (13) above.

When the filling member is composed of a plurality of materials (n materials), combined thermal conductivity computed in consideration of the structure of the filling member and the types of materials is used as the thermal conductivity (k) in formulas (11) and (13) above, and the thermal resistance ($\theta_d$) per unit area in the thickness direction can be represented by formula (13) above. As described above, the effective thermal resistance per unit area in the thickness direction that is determined in consideration of the structure of the filling member and the types of materials can be used as the thermal resistance ($\theta_d$) per unit area in the thickness direction.

The combined thermal conductivity can be computed by, for example, the following method. First, the combined thermal resistance (R) of a composite member composed of a combination of n materials each having a thermal conductivity: $k_n$ [W/m·K], a thickness: $d_n$ [m], a thermal resistance: $R_n$ (n=1, 2, . . . , n) is determined. When the n materials are arranged in series, the combined thermal resistance (R) can be represented by formula (15) below.

$$R = R_1 + R_2 + R_3 + \ldots + R_n \tag{15}$$

When the n materials are arranged in parallel, the combined thermal resistance (R) can be represented by formula (16) below. In this case, $R_n = \theta_{pn}$.

$$1/R = 1/R_1 + 1/R_2 + 1/R_3 + \ldots + 1/R_n \tag{16}$$

Next, the combined thermal conductivity of the composite member including the n materials arranged in series is computed. In this case, it is assumed that the cross-sectional areas ($A_n$) of the n materials in a heat transfer direction are the same. Specifically, $A_1 = A_2 = A_3 = \ldots = A_n = A$ [m²]. Then the thermal resistance ($R_n$) of a material is represented by formula (17) using the thermal resistance ($\theta_{dn}$) per unit cross-sectional area.

$$R_n = \theta_n/A \tag{17}$$

By modifying formula (15) using formulas (17) and (13), formula (18) below is obtained.

$$R = (\theta_{d1} + \theta_{d2} + \theta_{d3} + \ldots + \theta_{dn})/A \quad (18)$$
$$= (d_1/k_1 + d_2/k_2 + d_3/k_3 + \ldots + d_n/k_n)/A$$

Let the combined thermal conductivity of the composite member be κ. Since the total thickness of the composite member is $\Sigma d_n$, the combined thermal conductivity (κ) can be represented also by formula (19) below.

$$R = (\Sigma d_n/\kappa)/A \quad (19)$$

Using formulas (18) and (19), the combined thermal conductivity (κ) in the thickness direction can be represented as follows.

$$\kappa = \sum d_n / \sum (d_n/k_n)$$
$$= (d_1 + d_2 + d_3 + \ldots + d_n)/$$
$$(d_1/k_1 + d_2/k_2 + d_3/k_3 + \ldots + d_n/k_n)$$

The combined thermal conductivity of the composite member including the n materials arranged in parallel is computed as follows. In this case, it is assumed that the thicknesses of the n materials in the heat transfer direction are the same. Specifically, $d_1 = d_2 = d_3 = \ldots = d_n$ [m]. Let the cross-sectional area of each of the n materials in the heat transfer direction be $A_n$ [m$^2$]. Then the thermal resistance ($R_n$) of each material can be represented as follows using the thermal resistance ($\theta_{pn}$) in a plane direction.

$$R_n = \theta_{pn} \quad (20)$$

By modifying formula (16) using formulas (20) and (14), formula (21) below is obtained.

$$1/R = 1/\theta_{p1} + 1/\theta_{p2} + 1/\theta_{p3} + \ldots + 1/\theta_p n \quad (21)$$
$$= d_1 k_1 + d_2 k_2 + d_3 k_3 + \ldots + d_n k_n$$

Let the combined thermal conductivity of the composite member be κ. Since the total thickness of the composite member is $\Sigma d_n$, the combined thermal conductivity (κ) in the plane direction can be represented also by formula (22) below.

$$R = \kappa \cdot \Sigma d_n \quad (22)$$

Using formulas (21) and (22), the combined thermal conductivity (κ) in the plane direction can be represented as follows.

$$\kappa = \sum (d_n/k_n) / \sum d_n \quad (23)$$
$$= (d_1 k_1 + d_2 k_2 + d_3 k_3 + \ldots + d_n k_n)/$$
$$(d_1 + d_2 + d_3 + \ldots + d_n)$$

Even when the partition member has the comb structure, as does the filling member 1B, or has a hollow structure, a lattice structure, etc., the combined thermal conductivity can be computed when the thermal conductivity of air that is the material of the hollow portions and the thicknesses and cross-sectional areas of the hollow portions are given.

When the average temperature of one of the two surfaces of a filling member that are orthogonal to the thickness direction (e.g., one of the surfaces 1a to 1d) exceeds 180° C., the thermal conductivity of the filling member in the thickness direction is preferably from $2.0 \times 10^{-2}$ W/m·K to 2.0 W/m·K inclusive. When the average temperature of the above surface (e.g., one of the surfaces 1a to 1d) does not exceed 80° C., the thermal conductivity of the filling member in the thickness direction is preferably from $5.0 \times 10^{-2}$ W/m·K to 50 W/m·K inclusive.

[Method for Adjusting Thermal Resistance of Filling Member]

A description will be given of a method for adjusting the thermal resistance ($\theta_d$) per unit area of the filling member in the thickness direction to a desired value.

When the filling member is composed of two materials A and B, the thermal resistance in the thickness direction is adjusted to the desired value as follows. (When the partition members 21 in FIG. 1C are composed of a material A and the heat transfer sheets 22 are composed of a material B, the thermal resistance of the filling member in the thickness direction can be adjusted as follows.)

The material A is a material whose thermal resistance ($\theta_d$) per unit area in the thickness direction satisfies formula (1) above. Suppose that the thermal conductivity k of the material A is $k \leq 0.20$ [W/m·K] and its thickness is $d = 1.0$ [mm]. Then the thermal resistance per unit area in the thickness direction is $\theta_d = d/k \geq (1.0 \times 10^{-3})/0.20 = 5.0 \times 10^{-3}$ [m$^2$·K/W].

The material A is, for example, a resin plate formed of polycarbonate or butyl rubber.

The material B is a material whose thermal resistance ($\theta_d$) per unit area in the thickness direction satisfies formula (2) above. Suppose that the thermal conductivity k of the material B is $k \geq 0.25$ [W/m·K] and its thickness is $d = 1.0$ [mm]. Then the thermal resistance per unit area in the thickness direction is $\theta = d/k \leq (1.0 \times 10^{-3})/0.25 = 4.0 \times 10^{-}$ [m$^2$·K/W]. When the material B is solid, it is, for example, a ceramic, a glass plate, polyethylene, etc. When the material B is liquid, it is water, ethylene glycol, glycerin, etc.

A description will be given of a first example of the filling member whose thermal resistance ($\theta_d$) per unit area in the thickness direction satisfies formula (1) above at a temperature equal to or higher than T [° C.] and satisfies formula (2) at a temperature lower than T [° C.]. This filling member is obtained by removing the frame 32 from the filling member 30 in FIG. 1D. Specifically, the filling member includes the pouch structure 31 and the fluid material 34.

In this example, the pouch structure 31 is formed of the material A having a melting point at a temperature higher than T [° C.]. The pouch structure 31 is charged with the fluid material 34 that is in a liquid state at T [° C.]. The fluid material is preferably one of water, ethylene glycol, glycerin, etc. exemplified for the material B when it is liquid.

As described above, the opening 31e is closed with the stopper 33 formed of a material having a melting point around T [° C.]. Examples of the material of the stopper 33 include propylene-butylene-ethylene terpolymers, polypropylene, polyethylene, ethylene-propylene copolymers, ethylene-acrylic acid copolymers, propylene-acrylic acid copolymers, nylon, polyethylene terephthalate, tin-lead alloys, tin-bismuth alloys, and lead-bismuth alloys. When the stopper 33 melts, the fluid material 34 flows down through the opening 33 to the outside.

The pouch structure may have an outer shape other than the cuboidal shape. In FIG. 1D, the opening is provided on the lower surface of the pouch structure. However, the opening may be provided on a side surface so long as the material B can flow down through the opening to the outside of the pouch structure. The filling member 1 may have a structure in which a plurality of pouch structures filled with the material B described above are arranged horizontally or vertically. The stopper is not always necessary. The melting point of a material C may be equal to or lower than the melting point of the material B. The stopper may be formed of the material B. It is not always necessary that the material B be liquid at T [° C.], and the material B can be in a fluid state other than the liquid state.

When the surface temperature of the filling member including the pouch structure 31 and the fluid material 34 is lower than T [° C.], the fluid material in the pouch structure allows the thermal resistance ($\theta_d$) per unit area in the thickness direction to satisfy formula (2) above. When the surface temperature of the filling member becomes equal to or higher than T[° C.], the fluid material flows out to the outside of the pouch structure. Therefore, the filling member is composed of the pouch structure, so that the thermal resistance ($\theta_d$) per unit area of the filling member in the thickness direction satisfies formula (1) above.

The filling member 1D in FIG. 1D will be described as a second example of the filling material whose thermal resistance ($\theta_d$) per unit area in the thickness direction satisfies formula (1) above at a temperature equal to or higher than T [° C.] and satisfies formula (2) above at a temperature lower than T [° C.].

In this example, the lattice-shaped frame 32 formed of the material A is disposed inside the pouch structure 31 formed of the material A. An inner portion of the pouch structure 31 other than the frame 32 is filled with the fluid material 34 formed of the material B that is in a liquid state at T [° C.]. The opening 31e is closed with the stopper 33 formed of the material C having a melting point around T [° C.]. When the stopper 33 formed of the material C melts at around T [° C.], the fluid material 34 flows out through the opening 31e. When the surface temperature of the filling member 1D is lower than T [° C.], the fluid material charged into the pouch structure 31 allows the thermal resistance ($\theta_d$) per unit area in the thickness direction to satisfy formula (2) above. When the surface temperature of the filling member 1D becomes equal to or higher than T [° C.], the fluid material 34 flows out. Therefore, the filling member 1D is composed of the pouch structure 31 and the frame 32 that are formed of the material A, so that the thermal resistance ($\theta_d$) per unit area of the filling member in the thickness direction satisfies formula (1) above.

[Battery Pack]

The battery pack of the present invention includes a plurality of pouch cells and the filling members of the present invention, and the pouch cells are separated by the filling members.

<Pouch Cells>

In the present invention, "the pouch cell" means a single cell including a positive electrode sheet, a negative electrode sheet, a separator sheet, and terminals and further including resin-made sheets or films, laminates thereof, or laminates of these sheets or films and metal foils that are used as exterior members for housing the above components of the cell.

Lithium ion secondary batteries can be produced in various forms. Representative examples of the lithium ion secondary batteries include rectangular lithium ion secondary batteries, cylindrical lithium ion secondary batteries, and lithium ion pouch secondary batteries. Of these, the lithium ion pouch secondary battery generally include an electrode assembly and a case that houses the electrode assembly. The electrode assembly includes a negative electrode sheet prepared by applying a carbon material capable of occluding and releasing lithium ions to a metal sheet, a positive electrode sheet prepared by applying a lithium-containing oxide to a metal sheet, and a separator sheet interposed between the negative electrode and the positive electrode to electrically insulate these electrodes from each other. Terminals for outputting electric power from the negative electrode sheet and the positive electrode sheet to the outside are attached to the electrode assembly.

The lithium ion pouch secondary battery includes a pouch case formed from sheets each produced by laminating a polymer film and a metal sheet such as an aluminum sheet. The case is produced by bonding or fusing the two sheets each formed by laminating the polymer film and the metal sheet such as the aluminum sheet and has an inner space capable of housing the electrode assembly.

In the lithium ion pouch secondary battery, the electrode assembly is inserted into the pouch case having the space formed therein, and then an electrolyte is injected into the pouch case. Then the circumference of the pouch case is sealed by bonding or fusion, and the lithium ion pouch secondary battery is thereby completed.

The lithium ion pouch secondary battery uses the pouch case formed of the sheets. Therefore, one advantage of lithium ion pouch secondary batteries is that various lightweight lithium secondary batteries can be produced, and another advantage is that their production process is simple. The lithium ion pouch secondary batteries can be easily assembled, and there are few restrictions on the form and size of the batteries. Generally, each battery has a substantially box shape. The longitudinal and transverse lengths of the battery produced are about 5 mm to and 500 mm, and its thickness is about 0.5 mm to about 30 mm.

However, one problem is that, since the lithium ion pouch secondary battery uses the pouch case and does not include a metal can used in cylindrical and rectangular batteries, the ability to dissipate heat to the outside is poorer, and this greatly affects the charge-discharge performance and safety of the battery. One problem that occurs when the battery formed has a box shape is that it is difficult to form flat side surfaces, so that it is difficult to bring the side surfaces into direct contact with cooling plates disposed outside the battery in order to cool the battery.

The "abnormal heat generation state" of a pouch cell in a battery pack means the state in which a decomposition reaction occurs in the pouch cell to cause a short circuit or heat generation and thereby cause part of or the entire pouch cell to be heated to 200° C. or higher. The "thermal runaway" is the phenomenon in which a pouch cell enters the abnormal heat generation state and the heating rate of the pouch cell becomes larger than its cooling rate, so that the temperature cannot be controlled. A "normal condition" (normal temperature) is the condition in which the temperature of a pouch cell is equal to or lower than the upper limit of the temperature at which the pouch cell can be normally charged or discharged without significant capacity degradation. Specifically, the normal condition is a condition of a temperature equal to or lower than the upper limit use temperature specified by the manufacturer and is typically 80° C. or lower.

One example of the cell in the pouch cell is a lithium ion secondary cell including positive and negative electrodes capable of occluding and releasing lithium ions and an electrolyte. In addition to the lithium ion secondary cell, secondary cells such as all solid state lithium ion cells, nickel-hydrogen cells, nickel-cadmium cells, and lead storage cells are usable.

As described above, each of the pouch cells used in the battery pack of the present invention is generally enclosed by the exterior material. Preferably, the exterior material has a layered structure including a resin layer and a metal foil layer.

The resin layer included in the exterior material is, for example, a single layer of one material selected from the group consisting of propylene-butylene-ethylene ternary copolymers, polypropylene, polyethylene, ethylene-propylene copolymers, ethylene-acrylic acid copolymers, propylene-acrylic acid copolymers, nylon, and polyethylene or a composite layer including a combination of two or more of the above materials. Examples of the metal foil layer included in the exterior material include aluminum, copper, and stainless steel. The aluminum foil may be formed only of pure aluminum but is preferably formed of an aluminum alloy. Examples of the aluminum alloy used for the aluminum foil include aluminum-Fe-based alloys and aluminum-Mn-based alloys. The aluminum alloy is preferably an aluminum-Fe-based alloy.

As exemplified in FIG. 1C, it is preferable that the battery pack of the present invention includes the pouch cells and the filling members (in FIG. 1C, the filling members 20 each including a partition member 21 and a heat transfer sheet 22) that are disposed on the cooling plate. In the thus-configured battery pack, when the pouch cells generate heat in their steady state, heat can transfer sufficiently in plane directions of the filling members. Therefore, the heat of the pouch cells transfers to the cooling plate sufficiently, so that the pouch cells are cooled efficiently.

The material of the cooling plate may be a metal plate. Examples of the metal include aluminum, copper, steel, and SUS. A liquid passage may be formed in the metal plate, and a coolant may be circulated in the passage. A tube or a heat sink having a liquid passage may be in contact with the metal plate. Preferably, the cooling plate is an aluminum plate or a plate having an integrated structure including an aluminum plate and a coolant circulation structure (a structure including an aluminum plate having a hollow structure for passage of the coolant). The thickness of the cooling plate is preferably from 0.5 mm to 30 mm inclusive. When no coolant passage is formed inside the cooling plate, its thickness is preferably from 0.5 mm to 10 mm inclusive and more preferably from 0.5 mm to 2 mm inclusive.

EXAMPLES

The present invention will next be described more specifically by way of Examples, but the present invention is not limited to these Examples.

Reference Comparative Example 1

Figure 2A:
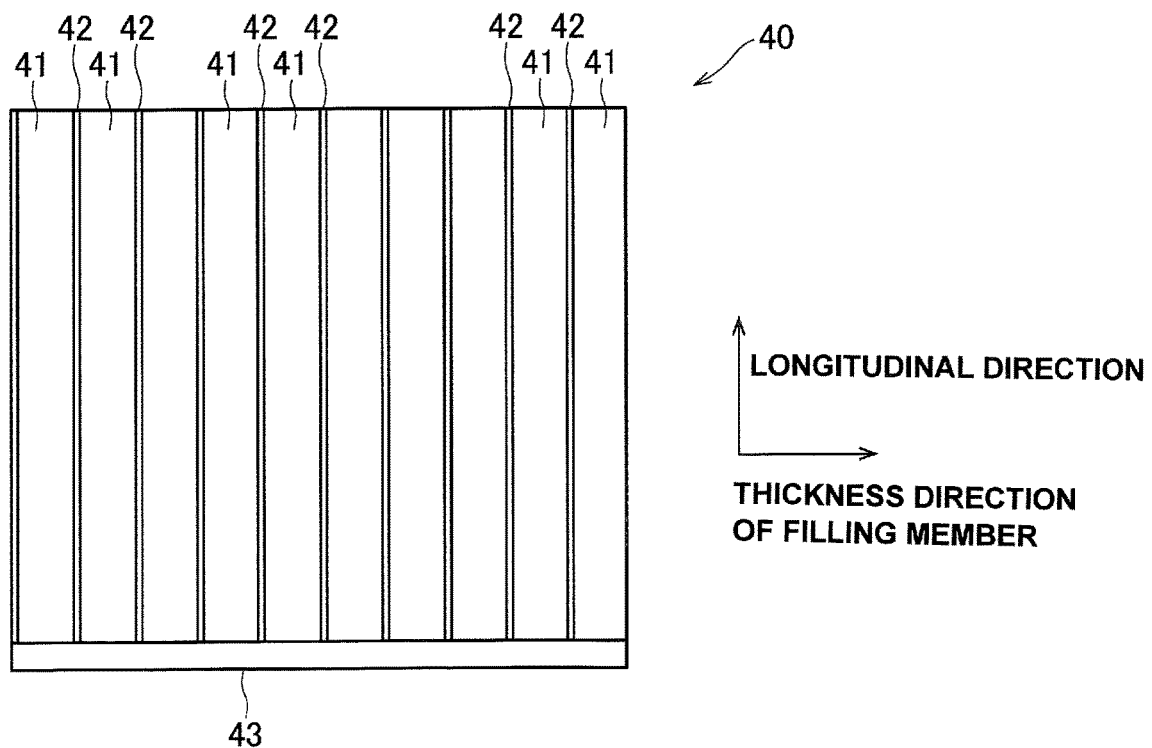
FIG. 2A shows a two-dimensional simulation model of a battery pack used in an Example.

Using a two-dimensional simulation model 40 of a battery pack shown in FIG. 2A, a simulation of its heat transfer characteristics was conducted. In the simulation model 40, a filling member 42 is disposed between each two adjacent pouch cells of ten pouch cells 41. The pouch cells 41 and the filling members 42 are placed on a cooling plate 43.

Each pouch cell 41 is enclosed by a very thin plastic film. However, since the thermal resistance of the film is small, the film is not included in the model.

It was assumed that the contact between the cooling plate 43 and the bottom surfaces of the pouch cells 41 and the filling members 42 was insufficient and that adiabatic boundaries were formed at their boundary surfaces.

The dimensions of the components are shown in Table 1.

TABLE 1

|  | Filling member | Pouch cell | Cooling plate |
| --- | --- | --- | --- |
| Thickness [mm] | 1.0 | 10.0 | 5.0 |
| Length [mm] | 100.0 | 100.0 | 110.0 |

Reference Comparative Example 2

Figure 2B:
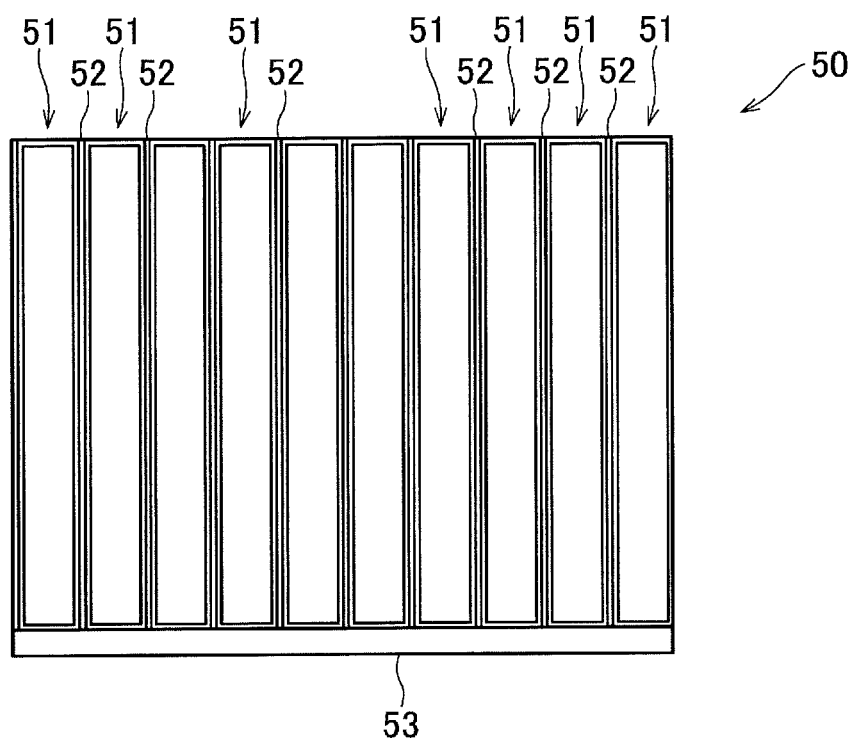
FIG. 2B shows a two-dimensional simulation model of a battery pack used in an Example.

A simulation was conducted using a simulation model 50 of a battery pack shown in FIG. 2B. In the simulation model 50, a filling member 52 is disposed between each two adjacent can cells of ten can cells (pouch cells enclosed by cans) 51. The can cells 51 and the filling members 52 are placed on a cooling plate 53. It was assumed that the cans were in close contact with the cooling plate 53. The dimensions of the components are shown in Table 2.

TABLE 2

|  | Filling member | Pouch cell | Cooling plate | Can |
| --- | --- | --- | --- | --- |
| Thickness [mm] | 1.0 | 10.0 | 5.0 | 1.0 |
| Length [mm] | 102.0 | 100.0 | 110.0 | 102.0 × 12.0 |

Next, the physical properties of the components used are shown in Table 3. The filling members 52 are formed of a material whose thermal conductivity changes at 100° C. In the simulation, the components were divided into small regions called meshes to perform heat transfer analysis. When the temperatures of all the small regions included in the filling members 52 reached 100° C., the thermal conductivity was changed.

When the average temperature of one of the two surfaces orthogonal to the thickness direction of each filling member exceeded 180° C., the thermal conductivity for 100° C. or higher was used. When the average temperatures of the two surfaces orthogonal to the thickness direction of the filling member both did not exceed 80° C., the thermal conductivity for less than 100° C. was used.

TABLE 3

|  | Filling member | Pouch cell | Can, cooling plate |
| --- | --- | --- | --- |
| Density [kg/m$^3$] | 975 | 2522 | 2702 |
| Specific heat [J/kg · K] | 837 | 880 | 903 |
| Thermal conductivity[W/m · K] | 0.5 (lower than 100° C.) | 1.7 (thickness direction) | 237 |
|  | 0.15 (100° C. or higher) | 32.5 (orthogonal direction) |  |

[Thermal Runaway Simulation]

It was assumed that the leftmost pouch cells in the battery packs shown in FIGS. 2A and 2B underwent thermal runaway. The initial temperature of these pouch cells was set to 700° C., and initial temperature of other components was set to 23° C. It was assumed that the outer circumference of each battery pack was in contact with air, and a boundary condition for natural convection (4.0 W/m²·K) was used. The initial temperature of the battery pack as a whole was set to 25° C., and the temperature of air around the outer circumference was also set to 25° C.

Figure 2C:
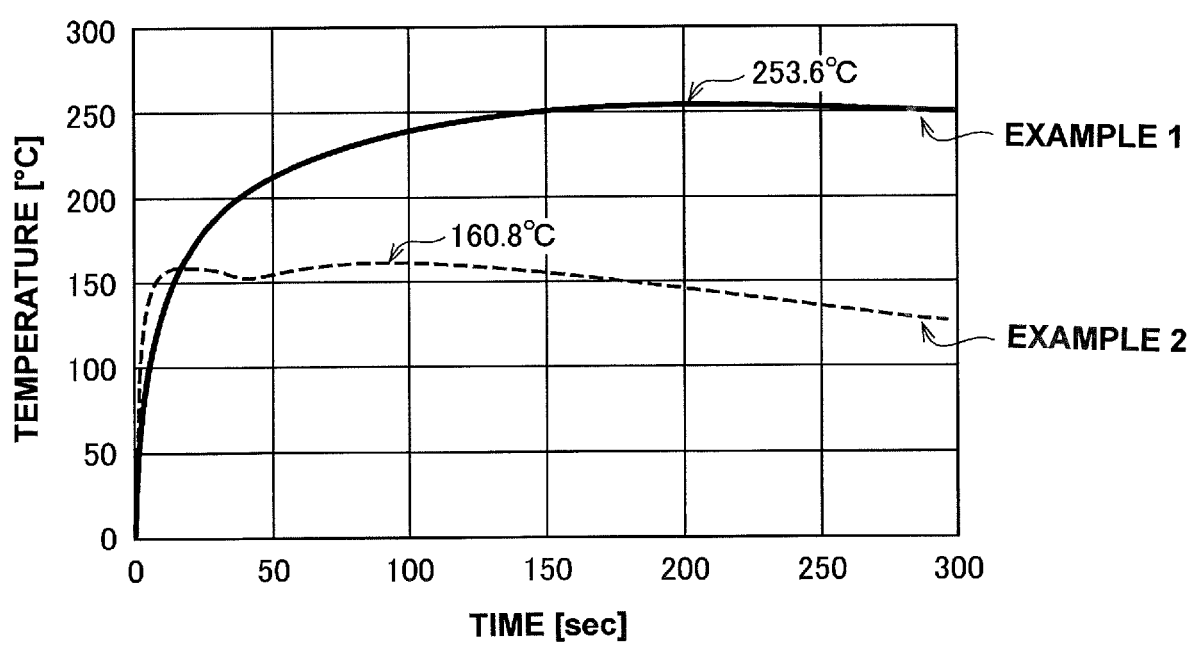
FIG. 2C is a graph showing changes in maximum temperatures of single electrodes over time.

FIG. 2C shows a change in maximum temperature of an adjacent pouch cell over time. In Example 1, the maximum temperature was 253.6° C. In Example 2, the maximum temperature was 160.8° C. The increase in temperature was much smaller in Example 2 than in Example 1. As can be seen from the results, it is preferable that heat transfer sheets for dissipating heat of the pouch cells to the cooling plate are disposed between the cooling plate and the pouch cells.

Example 1

Figure 2D:
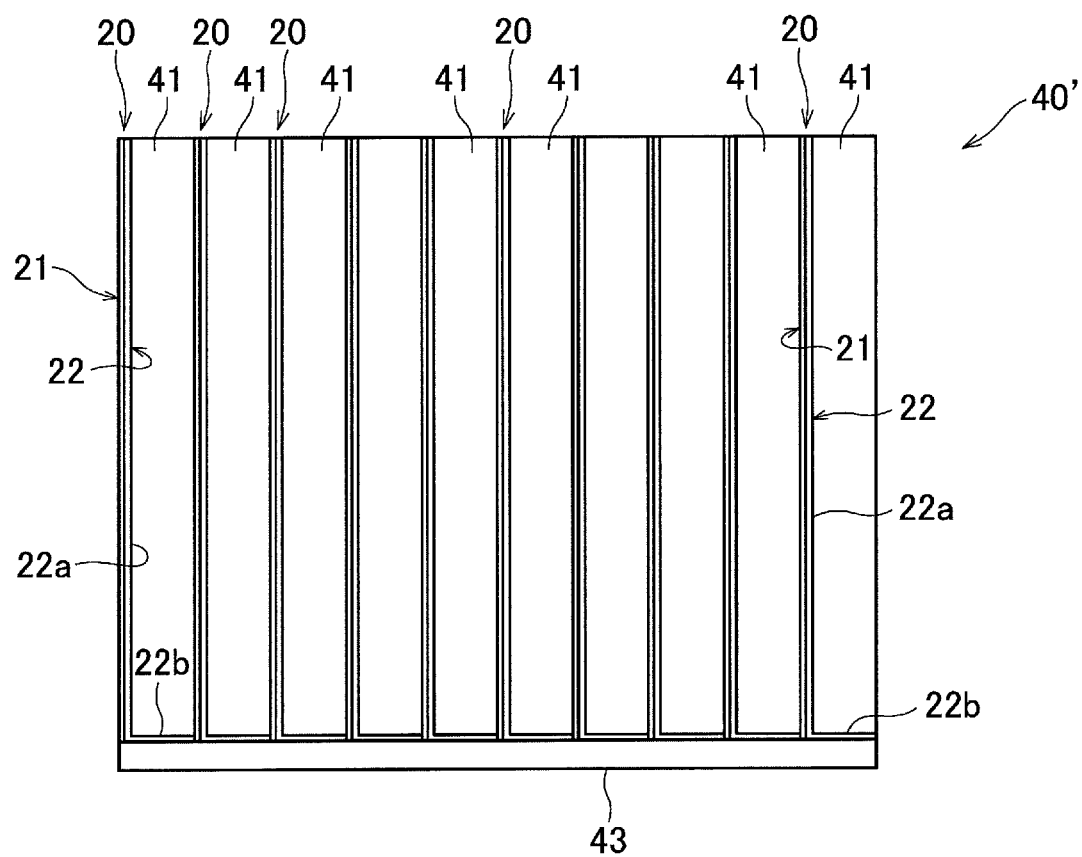
FIG. 2D shows a simulation model of a battery pack used in Examples.

Based on the above findings, heat transfer analysis was conducted on a simulation model 40' shown in FIG. 2D.

In the simulation model 40', filling members 20 prepared by stacking the partition members 21 shown in FIG. 1C on the respective heat transfer sheets 22 shown in FIG. 1C were used instead of the filling members 42. It was assumed that the contact between the bottom surface of each pouch cell 41 and the extending piece 22b of a corresponding heat transfer sheet 22 was insufficient, so that the boundary surface was an adiabatic boundary. The dimensions of each component are shown in Table 4.

TABLE 4

|  | Partition member | Pouch cell | Cooling plate | Heat transfer sheet |
|---|---|---|---|---|
| Thickness [mm] | 1.0 | 10.0 | 5.0 | 1.0 |
| Length [mm] | 101.0 | 100.0 | 120.0 | 101.0 × 11.0 |

The same physical properties as those in Table 3 were used for the partition members, the pouch cells, and the cooling plate. In the simulation, the maximum temperature of an adjacent pouch cell was determined using heat transfer sheets with different thermal conductivities [W/m·K]: 0.1, 0.2, 0.5, 1.0, 10, 50, 100, 500, 1000, 5000, and 10000. The results are shown in Table 5.

The thermal conductivity of the partition members was changed at 100° C. as shown in the filling member column in Table 3.

Comparative Example 1

A simulation was performed under the same conditions as those in Example 1 except that the thermal conductivity of the partition members was not changed and was held at a constant value of 0.15 W/m·K. The results are shown in Table 5. "Difference in maximum temperature" in Table 5 is the difference between the maximum temperature in Example 1 and the maximum temperature in Comparative Example 1.

TABLE 5

| | Maximum temperature of adjacent pouch cell [° C.] | | |
|---|---|---|---|
| Thermal conductivity of heat transfer sheets [W/m · K] | Thermal conductivity not changed (Comparative Example 1) | Thermal conductivity changed (Example 1) | Difference in maximum temperature Δt [° C.] |
| 0.1 | 206.3 | 203.7 | 2.6 |
| 0.2 | 214.7 | 211.6 | 3.1 |
| 0.5 | 221.3 | 216.2 | 5.1 |
| 1 | 223.3 | 216.3 | 7.0 |
| 10 | 219.9 | 211.0 | 8.9 |
| 50 | 211.6 | 203.5 | 8.0 |
| 100 | 207.7 | 200.8 | 6.9 |
| 500 | 187.4 | 185.2 | 2.2 |
| 1000 | 179.0 | 178.9 | 0.1 |
| 5000 | 172.2 | 171.8 | 0.4 |
| 10000 | 171.7 | 170.3 | 1.4 |
| No heat transfer sheets | 259.4 | 253.6 | 5.8 |

As can be seen from Table 5, the maximum temperature of the adjacent pouch cell was lower when the thermal conductivity of the partition members was changed at 100° C., irrespective of the thermal conductivity of the heat transfer sheets. However, when the thermal conductivity was excessively small or excessively large, the difference Δt between the maximum temperature when the thermal conductivity was not changed and the maximum temperature when the thermal conductivity was changed tended to be small. Specifically, it was found that the effect was highest when the thermal conductivity was changed while the thermal conductivity of the heat transfer sheets was set to a certain value (about 10.0 W/m·K in this case).

In Example 1, the partition members whose thermal conductivity was changed at 100° C. were used, and the partition members and the heat transfer sheets were joined together. The thermal resistances in the thickness direction at lower than 100° C. and at 100° C. or higher were determined using formula (18) with A=1.0, and the results are shown in Table 6. The thermal resistances in a plane direction were determined using formula (21), and the results are shown in Table 7. When the thermal conductivity is not changed, the combined thermal resistances are the same as those at 100° C. or higher in Tables 6 and 7.

TABLE 6

| Thermal resistance of heat transfer sheets in thickness direction ×10⁻⁶ [m² · K/W] | Thermal resistance of partition members in thickness direction at lower than 100° C. ×10⁻⁶ [m² · K/W] | Thermal resistance of partition members in thickness direction at 100° C. or higher ×10⁻⁶ [m² · K/W] | Combined thermal resistance θ_{d2} in thickness direction at lower than 100° C. ×10⁻⁶ [m² · K/W] | Combined thermal resistance θ_{d1} in thickness direction at 100° C. or higher ×10⁻⁶ [m² · K/W] |
|---|---|---|---|---|
| 10000 | 2000 | 6666.7 | 12000.0 | 16666.7 |
| 5000 | 2000 | 6666.7 | 7000.0 | 11666.7 |
| 2000 | 2000 | 6666.7 | 4000.0 | 8666.7 |
| 1000 | 2000 | 6666.7 | 3000.0 | 7666.7 |

TABLE 6-continued

| Thermal resistance of heat transfer sheets in thickness direction ×10⁻⁶ [m²·K/W] | Thermal resistance of partition members in thickness direction at lower than 100° C. ×10⁻⁶ [m²·K/W] | Thermal resistance of partition members in thickness direction at 100° C. or higher ×10⁻⁶ [m²·K/W] | Combined thermal resistance $\theta_{d2}$ in thickness direction at lower than 100° C. ×10⁻⁶ [m²·K/W] | Combined thermal resistance $\theta_{d1}$ in thickness direction at 100° C. or higher ×10⁻⁶ [m²·K/W] |
|---|---|---|---|---|
| 100 | 2000 | 6666.7 | 2100.0 | 6766.7 |
| 50 | 2000 | 6666.7 | 2050.0 | 6716.7 |
| 10 | 2000 | 6666.7 | 2010.0 | 6676.7 |
| 5 | 2000 | 6666.7 | 2005.0 | 6671.7 |
| 1.0 | 2000 | 6666.7 | 2001.0 | 6667.7 |
| 0.5 | 2000 | 6666.7 | 2000.6 | 6667.2 |
| 0.2 | 2000 | 6666.7 | 2000.2 | 6666.9 |
| 0.1 | 2000 | 6666.7 | 2000.1 | 6666.8 |

TABLE 7

| Thermal resistance of heat transfer sheets in plane direction [K/W] | Thermal resistance of partition members in plane direction at lower than 100° C. [K/W] | Thermal resistance of partition members in plane direction at 100° C. or higher [K/W] | Combined thermal resistance $\theta_{p2}$ in plane direction at lower than 100° C. [K/W] | Combined thermal resistance $\theta_{p1}$ in plane direction at 100° C. or higher [K/W] |
|---|---|---|---|---|
| 10000 | 2000 | 6666.7 | 1666.7 | 4000.0 |
| 5000 | 2000 | 6666.7 | 1428.6 | 2857.1 |
| 2000 | 2000 | 6666.7 | 1000 | 1538.5 |
| 1000 | 2000 | 6666.7 | 666.7 | 869.6 |
| 100 | 2000 | 6666.7 | 95.2 | 98.5 |
| 50 | 2000 | 6666.7 | 48.6 | 49.6 |
| 10 | 2000 | 6666.7 | 10.0 | 10.0 |
| 5 | 2000 | 6666.7 | 5.0 | 5.0 |
| 1 | 2000 | 6666.7 | 1.0 | 1.0 |
| 0.5 | 2000 | 6666.7 | 0.5 | 0.5 |
| 0.2 | 2000 | 6666.7 | 0.2 | 0.2 |
| 0.1 | 2000 | 6666.7 | 0.1 | 0.1 |

As can be seen from Table 6, the smaller the thermal resistance of the heat transfer sheets, the closer the combined thermal resistance in a plane direction at lower than 100° C. is to the combined thermal resistance at 100° C. or higher. However, even in this case, the combined resistances in the thickness direction were different, and the effect of reducing the maximum temperature of the adjacent cell was higher when the thermal resistance was changed.

Example 2 and Comparative Example 2

The same analysis as the analysis performed in Example 1 and Comparative Example 1 was performed except that, although the thickness of the heat transfer sheets was not changed, the thickness of the partition members was reduced to 0.5 mm.

TABLE 8

|  | Partition member | Electrode | Cooling plate | Heat transfer sheet |
|---|---|---|---|---|
| Thickness [mm] | 0.5 | 10.0 | 5.0 | 1.0 |
| Length [mm] | 101.0 | 100.0 | 120.0 | 101.0 × 11.0 |

The same physical properties as those in Table 3 were used for the partition members, the pouch cells, and the cooling plate. The results are shown in Table 9. "Difference in maximum temperature" in Table 9 is the difference between the maximum temperature in Example 2 and the maximum temperature in Comparative Example 2.

TABLE 9

| Thermal conductivity of heat transfer sheets [W/m·K] | Maximum temperature of adjacent pouch cell [° C.] | | Difference in maximum temperature $\Delta t$ [° C.] |
|---|---|---|---|
| | Thermal conductivity not changed (Comparative Example 2) | Thermal conductivity changed (Example 2) | |
| 0.1 | 196.2 | 194.2 | 2 |
| 0.2 | 199.5 | 196.9 | 2.6 |
| 0.5 | 201.3 | 196.6 | 4.7 |
| 1 | 200.8 | 193.2 | 7.6 |
| 10 | 188.6 | 170.3 | 18.3 |
| 50 | 181.2 | 165.5 | 15.7 |
| 100 | 180.2 | 165.9 | 14.3 |
| 500 | 177.5 | 166.4 | 11.1 |
| 1000 | 175.7 | 166.2 | 9.5 |
| 5000 | 176.0 | 173.4 | 2.6 |
| 10000 | 179.8 | 177.1 | 2.7 |
| No heat transfer sheets | 207.6 | 227.9 | 20.3 |

As can be seen from Table 9, even when the thickness of the partition members was reduced, the maximum temperature of an electrode of the adjacent pouch cell was lower when the thermal conductivity of the partition members was changed at 100° C., irrespective of the thermal conductivity of the heat transfer sheets. However, when the thermal conductivity was excessively small or excessively large, the difference $\Delta t$ between the maximum temperature when the thermal conductivity was not changed and the maximum temperature when the thermal conductivity was changed tended to be small. Specifically, it was found that the effect was highest when the thermal conductivity was changed while the thermal conductivity of the heat transfer sheets was set to a certain value (about 10.0 W/m·K in this case).

The reason that the maximum temperatures of the adjacent cell in Table 9 are generally lower than those in Table 5 may be that, since the thickness of a partition member 21 on the left side of the cell undergoing thermal runaway is smaller, heat dissipation from the cell undergoing thermal runaway is facilitated. Specifically, it is preferable that no partition member 21 is provided on the left side and only a heat transfer sheet is provided.

In Example 2, the partition members whose thermal conductivity was changed at 100° C. were used, and the partition members and the heat transfer sheets were joined together. The thermal resistances in the thickness direction at lower than 100° C. and at 100° C. or higher were determined using formula (18) with A=1.0, and the results are shown in Table 10. The thermal resistances in a plane direction were determined using formula (21), and the results are shown in Table 11. In Comparative Example 2 in which the thermal conductivity is not changed, the combined thermal resistances are the same as those at 100° C. or higher in Tables 10 and 11.

TABLE 10

| Thermal resistance of heat transfer sheets in thickness direction ×10⁻⁶[m²·K/W] | Thermal resistance of partition members in thickness direction at lower than 100° C. ×10⁻⁶[m²·K/W] | Thermal resistance of partition members in thickness direction at 100° C. or higher ×10⁻⁶[m²·K/W] | Combined thermal resistance $\theta_{d2}$ in thickness direction at lower than 100° C. ×10⁻⁶[m²·K/W] | Combined thermal resistance $\theta_{d1}$ in thickness direction at 100° C. or higher ×10⁻⁶[m²·K/W] |
|---|---|---|---|---|
| 10000 | 1000 | 3333.3 | 11000 | 13333.3 |
| 5000 | 1000 | 3333.3 | 6000 | 8333.3 |
| 2000 | 1000 | 3333.3 | 3000 | 5333.3 |
| 1000 | 1000 | 3333.3 | 2000 | 4333.3 |
| 100 | 1000 | 3333.3 | 1100 | 3433.3 |
| 20 | 1000 | 3333.3 | 1020 | 3353.3 |
| 10 | 1000 | 3333.3 | 1010 | 3343.3 |
| 2 | 1000 | 3333.3 | 1002 | 3335.3 |
| 1 | 1000 | 3333.3 | 1001 | 3334.3 |
| 0.2 | 1000 | 3333.3 | 1000.2 | 3333.5 |
| 0.1 | 1000 | 3333.3 | 1000.1 | 3333.4 |

TABLE 11

| Thermal resistance of heat transfer sheets in plane direction [K/W] | Thermal resistance of partition members in plane direction at lower than 100° C. [K/W] | Thermal resistance of partition members in plane direction at 100° C. or higher [K/W] | Combined thermal resistance $\theta_{p2}$ in planer direction at lower than 100° C. [K/W] | Combined thermal resistance $\theta_{p1}$ in plane direction at 100° C. or higher [K/W] |
|---|---|---|---|---|
| 10000 | 4000 | 13333.3 | 2857.1 | 5714.3 |
| 5000 | 4000 | 13333.3 | 2222.2 | 3636.4 |
| 2000 | 4000 | 13333.3 | 1333.3 | 1739.1 |
| 1000 | 4000 | 13333.3 | 800 | 930.2 |
| 100 | 4000 | 13333.3 | 97.6 | 99.3 |
| 20 | 4000 | 13333.3 | 19.9 | 20.0 |
| 10 | 4000 | 13333.3 | 10.0 | 10.0 |
| 2 | 4000 | 13333.3 | 2.0 | 2.0 |
| 1 | 4000 | 13333.3 | 1.0 | 1.0 |
| 0.2 | 4000 | 13333.3 | 0.2 | 0.2 |
| 0.1 | 4000 | 13333.3 | 0.1 | 0.1 |

Example 3 and Comparative Example 3

Next, the thermal conductivity of the filling members at lower than 100° C. shown in Table 3 and the thermal conductivity at 100° C. or higher shown in Table 3 were changed to those shown in Table 12. In Comparative Example 3, the thermal conductivity was not changed. In Example 3, the thermal conductivity was changed. When the thermal conductivity was not changed, the thermal conductivity at 100° C. or higher was used.

TABLE 12

| | Partition member | Pouch cell | Can · cooling plate |
|---|---|---|---|
| Density [kg/m³] | 975 | 2522 | 2702 |
| Specific heat [J/kg · K] | 837 | 880 | 903 |
| Thermal conductivity [W/m · K] | 0.25 (less than 100° C.) 0.2 (100° C. or higher) | 1.7 (thickness direction) 32.5 (orthogonal direction) | 237 |

TABLE 13

| Thermal conductivity of heat transfer sheets [W/m · K] | Maximum temperature of adjacent pouch cell [° C.] | | Difference in maximum temperature Δt [° C.] |
|---|---|---|---|
| | Thermal conductivity not changed (Comparative Example 3) | Thermal conductivity changed (Example 3) | |
| 0.1 | 208.6 | 208 | 0.6 |
| 0.2 | 218.2 | 217.7 | 0.5 |
| 0.5 | 227.3 | 226.4 | 0.9 |
| 1 | 230.7 | 229.4 | 1.3 |
| 10 | 230.4 | 228.9 | 1.5 |
| 50 | 224.9 | 223.6 | 1.3 |
| 100 | 220.2 | 219.1 | 1.1 |
| 500 | 200.5 | 200.2 | 0.3 |
| 1000 | 191.6 | 191.6 | 0.0 |
| 5000 | 181.2 | 181.1 | 0.1 |
| 10000 | 179.2 | 178.9 | 0.3 |
| No heat transfer sheets | 268.2 | 267.0 | 1.2 |

As can be seen from Table 13, the maximum temperature of the adjacent pouch cell was lower when the thermal conductivity of the partition members was changed at 100° C., irrespective of the thermal conductivity of the heat transfer sheets. However, when the thermal conductivity was excessively small or excessively large, the difference Δt between the maximum temperature when the thermal conductivity was not changed and the maximum temperature when the thermal conductivity was changed tended to be small. Specifically, it was found that the effect was highest when the thermal conductivity was changed while the thermal conductivity of the heat transfer sheets was set to a certain value (about 10.0 W/m·K in this case).

In Example 3, the partition members whose thermal conductivity was changed at 100° C. were used, and the partition members and the heat transfer sheets were joined together. The thermal resistances in the thickness direction at lower than 100° C. and at 100° C. or higher were determined using formula (18) with A=1.0, and the results are shown in Table 14. The thermal resistances in a plane direction were determined using formula (21), and the results are shown in Table 15. In Comparative Example 3 in which the thermal conductivity is not changed, the combined thermal resistances are the same as those at 100° C. or higher in Tables 14 and 15.

The difference in maximum temperature Δt in Table 13 is smaller than the difference in maximum temperature Δt in Table 5. Specifically, when the difference between the thermal conductivity (or the thermal resistance) at lower than 100° C. and the thermal conductivity (or the thermal resistance) at 100° C. or higher is small, the difference in maximum temperature Δt tends to be small.

TABLE 14

| Thermal resistance of heat transfer sheets in thickness direction ×$10^{-6}$[m$^2$ · K/W] | Thermal resistance of partition members in thickness direction at lower than 100° C. ×$10^{-6}$[m$^2$ · K/W] | Thermal resistance of partition members in thickness direction at 100° C. or higher ×$10^{-6}$[m$^2$ · K/W] | Combined thermal resistance $\theta_{d2}$ in thickness direction at lower than 100° C. ×$10^{-6}$[m$^2$ · K/W] | Combined thermal resistance $\theta_{d1}$ in thickness direction at 100° C. or higher ×$10^{-6}$[m$^2$ · K/W] |
|---|---|---|---|---|
| 10000 | 4000 | 5000 | 14000 | 15000 |
| 5000 | 4000 | 5000 | 9000 | 10000 |
| 2000 | 4000 | 5000 | 6000 | 7000 |
| 1000 | 4000 | 5000 | 5000 | 6000 |
| 100 | 4000 | 5000 | 4100 | 5100 |
| 50 | 4000 | 5000 | 4050 | 5050 |
| 10 | 4000 | 5000 | 4010 | 5010 |
| 5 | 4000 | 5000 | 4005 | 5005 |
| 1.0 | 4000 | 5000 | 4001 | 5001 |
| 0.2 | 4000 | 5000 | 4000.2 | 5000.2 |
| 0.1 | 4000 | 5000 | 4000.1 | 5000.1 |

TABLE 15

| Thermal resistance of heat transfer sheets in plane direction [K/W] | Thermal resistance of partition members in plane direction at lower than 100° C. [K/W] | Thermal resistance of partition members in plane direction at 100° C. or higher [K/W] | Combined thermal resistance $\theta_{p2}$ in planer direction at lower than 100° C. [K/W] | Combined thermal resistance $\theta_{p1}$ in plane direction at 100° C. or higher [K/W] |
|---|---|---|---|---|
| 10000 | 4000 | 5000 | 2857.1 | 3333.3 |
| 5000 | 4000 | 5000 | 2222.2 | 2500 |
| 2000 | 4000 | 5000 | 1333.3 | 1428.6 |
| 1000 | 4000 | 5000 | 800 | 833.3 |
| 100 | 4000 | 5000 | 97.6 | 98.0 |
| 50 | 4000 | 5000 | 49.4 | 49.5 |
| 10 | 4000 | 5000 | 1.0 | 1.0 |
| 5 | 4000 | 5000 | 5.0 | 5.0 |
| 1 | 4000 | 5000 | 1.0 | 1.0 |
| 0.2 | 4000 | 5000 | 0.2 | 0.2 |
| 0.1 | 4000 | 5000 | 0.1 | 0.1 |

Although the present invention has been described in detail by way of the specific modes, it is apparent for those skilled in the art that various changes can be made without departing from the spirit and scope of the present invention.

The present application is based on Japanese Patent Application No. 2018-172560 filed on Sep. 14, 2018, the entire contents of which are incorporated herein by reference.

REFERENCE SIGNS LIST 1A, 1B filling member
10 battery pack
11 cooling plate
12 pouch cell
20 filling member
21 partition member
22 heat transfer sheet
30 filling member
31 pouch structure
32 frame
33 stopper
34 flowable material
40, 40', 50 simulation model of battery pack
41 pouch cell
51 can cell

The invention claimed is:

1. A filling member to be interposed between pouch cells of a battery pack, the filling member having a first surface orthogonal to a thickness direction thereof and a second surface opposite to the first surface, wherein $\theta_{d1}$ and $\theta_{d2}$ defined below satisfy formulas (1) and (2) below, respectively, wherein $\theta_p$ satisfies formula (3) below, and wherein $\theta_{d1} > \theta_{d2}$ holds:

$$\theta_{d1} \geq 3.0 \times 10^{-3} \ (m^2 \cdot K)/W, \quad (1)$$

$$\theta_{d2} \leq 8.0 \times 10^{-3} \ (m^2 \cdot K)/W, \quad (2)$$

$$0.5 \ K/W \leq \theta_{p1} \leq 1000 \ K/W, \quad (3)$$

$$0.5 \ K/W \leq \theta_{p2} \leq 1000 \ K/W, \quad (4)$$

$\theta_{d1}$: a heat transfer resistance per unit area in the thickness direction when the average temperature of one of the first and second surfaces exceeds 180° C., $\theta_{d2}$: a heat transfer resistance per unit area in the thickness direction when the average temperatures of the first and second surfaces both do not exceed 80° C., $\theta_{p1}$: a heat transfer resistance in a plane direction when the average temperature of one of the first and second surfaces exceeds 180° C., $\theta_{p2}$: a heat transfer resistance in the plane direction when the average temperatures of the first and second surfaces both do not exceed 80° C., wherein the filling member comprises a partition member and a heat transfer sheet, wherein, when the average temperature of one of the first and second surfaces exceeds 180° C., the thermal conductivity of the partition member in the thickness direction is from $2.0 \times 10^{-2}$ W/m·K to 2.0 W/m·K inclusive, wherein, when the average temperatures of the first and second surfaces both do not exceed 80° C., the thermal conductivity of the partition member in the thickness direction is from $5.0 \times 10^{-2}$ W/m·K to $5.0 \times 10^{1}$ W/m·K inclusive, and wherein the thermal conductivity of the heat transfer sheet in the plane direction is from $1.0 \times 10^{1}$ W/m·K to $2.0 \times 10^{3}$ W/m·K inclusive, irrespective of the temperature of the partition member.

2. The filling member according to claim 1, wherein the thickness of the heat transfer sheet is 0.02 mm to 2 mm.

3. The filling member according to claim 2, wherein the thickness of the filling member is 0.2 mm to 10 mm.

4. The filling member according to claim 1, wherein the thickness of the filling member is 0.2 mm to 10 mm.

5. A battery pack comprising: a plurality of pouch cells; and a filling member according to claim 1, the filling member being interposed between each two adjacent pouch cells of the plurality of pouch cells.

6. The battery pack according to claim 5, wherein the first and second surfaces of each of the filling member that is interposed between corresponding two adjacent pouch cells of the plurality of pouch cells face the respective two adjacent pouch cells of the plurality of pouch cells.

7. The battery pack according to claim 5, wherein the pouch cells are enclosed by an exterior material, and wherein the exterior material has a layered structure including a resin layer and a metal foil layer.

8. The battery pack according to claim 5, wherein, when the thickness of each of the pouch cells is L, the thickness of the filling member is L/50 to L/10.

9. The battery pack according to claim 5, wherein the filling member is the filling member according to any one of claims 2 to 4, and wherein, when the thickness of each of the pouch cells is L, the thickness of the heat transfer sheet is L/1000 to L/10.

* * * * *